Sept. 3, 1963   F. C. ARMISTEAD   3,102,956
GEOPHYSICAL PROSPECTING
Filed Nov. 14, 1955   2 Sheets-Sheet 2

INVENTOR.

BY

United States Patent Office 3,102,956
Patented Sept. 3, 1963

3,102,956
GEOPHYSICAL PROSPECTING
Fontaine C. Armistead, Richmond, Va., assignor to Texaco Development Corporation, New York, N.Y., a corporation of Delaware
Filed Nov. 14, 1955, Ser. No. 546,701
26 Claims. (Cl. 250—83.3)

This invention relates to geophysical prospecting, and in particular to determining the nature of formations traversed by a borehole in the earth by means of a radioactivity log in such a manner that the deleterious effects of the contents of the borehole on the log are at least substantially minimized.

Neutron-gamma borehole logging is practiced usually by passing an instrument which contains a source of neutrons and a detector of gamma radiation through a borehole. Fast neutrons from the source are sent into the formations and are slowed down to the thermal velocity or energy range in the borehole and earth formations in about one microsecond as the result of many atomic collisions. The thermal neutrons then travel about in the manner of a diffusing gas molecule and undergo many more collisions. After a time of about 200 microseconds, in average earth formations, borehole fluids, drilling muds, etc., the thermal neutrons are captured by the various atoms of the formations or borehole and the capture is accompanied by the emission of nuclear radiation from the capturing atom. The penetrative portion of this emitted radiation (in general, gamma radiation) is measured by the detector. There is practically no time lag between the emission of a gamma ray from an atom in the formation and its arrival at the detector, the time lag being of the order of a thousandth of a microsecond or less.

Such a log yields much useful information concerning the nature of the formations traversed by a borehole. However, the usefulness is lessened by the adverse effects of substances, such as the borehole fluid and even the logging instrument itself, contained within the borehole. Unfortunately, the atoms, such as atoms of hydrogenous material, comprising the borehole contents, after slowing fast neutrons to the thermal energy range, also react with these thermal neutrons to emit penetrative radiation. It is this latter radiation which, when received counted by the radiation detector, obscures the log and causes it to give misleading information.

My invention contemplates neutron-gamma logging of an earth formation with a pulsed neutron source wherein timed bursts of neutrons are emitted from the source, the detector being maintained inoperative or insensitive to penetrative radiation during the neutron emission and also for a brief period immediately following the cessation of the burst. Following this brief period the detector is placed and maintained in an operative or sensitive state for a predetermined period of radiation measurement, the source of neutron emission remaining cut off. This sequence is continuously repeated as the instrument moves past the formations undergoing investigation.

The fluid contents of well bores usually contain hydrogenous constituents which are acted upon by neutrons to produce secondary or induced radiation. More specifically, the borehole fluid moderates or slows down some of the neutrons to produce slow or thermal neutrons which react with the hydrogenous constituents to produce secondary radiation, such as gamma radiation, and to which the usual radiation detector component of a logging instrument is sensitive, thereby causing spurious counts. Accordingly, an object of this invention is to maintain the detector component insensitive until sufficient time has elapsed following each neutron burst for this secondary or induced radiation emanating from the well fluid to die down, and dissipate. The detector is then rendered sensitive to radiation for a period of time during which the radiation detected by it is principally emanating from the earth formation surrounding the borehole; that is to say, the gamma radiation induced in the formation as a result of the neutron bombardment. The output from the detector is thus a measure of radiation emanating from the formation substantially uninfluenced by radiation emanating from the borehole fluid.

In the usual neutron-gamma logging instrument it is necessary to provide a substantial amount of shielding between the neutron source and the sensitive volume of the detector since the usual neutron source also emits, simultaneously with the neutrons, gamma radiation in substantial amounts. Thus it is customary to place shields of considerable thickness between the source and the detector to prevent this gamma radiation emanating from the source from striking the detector. Such shields may be eight inches or more in thickness. An advantage of the present invention, therefore, is that such shielding can be eliminated since the detector is actually maintained inoperative during the neutron bombardment. This gives rise to a still further advantage, namely, that the spacing between the source and the detector can be materially reduced, which is advantageous from the standpoint of obtaining more accurate information.

The invention also contemplates, as an advantageous modification, surrounding the sensitive volume of the detector with a substance which reacts with thermal neutrons in a period of time different from that required by the materials present in the borehole and in the earth formations surrounding it. This thermal-neutron reactive substance can be incorporated in the borehole contents or can be provided as an integral part of the logging instrument.

The presence of this thermal neutron-reactive substance serves to shorten the average time that a neutron can survive before being captured in the borehole region. That is to say, it shortens the time which must elapse before substantially all the gamma radiation which results from the capture of thermal neutrons in the borehole has disappeared. Then, by maintaining the detector insensitive after the neutron burst for a period of time which is greater than this average survival time of a neutron in the borehole the troublesome counts arising from the borehole contents are substantially avoided. In the formation surrounding the borehole the average neutron survival time is substantially longer than the insensitive period of the detector. Therefore, on the average, the gamma radiation from the formation arrives at the detector after it is put into its sensitive or counting condition, whereas the gamma radiation from the borehole arrives at the detector before it is in its sensitive condition; that is, this gamma radiation reaches the detector during the time it is maintained inoperative. Thus a preferential detection of the gamma radiation arising in the formation as a result of interactions with neutrons from the source has been substantially effected.

Thermal neutron-reactive substances which may be used to practice my invention are any of a group of elements having large capture cross sections for thermal neutrons, for example, cadmium, chlorine, mercury, cobalt, samarium, europium, gadolinium, iridium, boron, and lithium.

As contemplated by my invention one of these thermal neutron-reactive substances is added to the contents of the borehole and the logging tool is passed through the borehole. The contents of the borehole and the formations surround it are irradiated with a timed burst of neutrons from the source in the logging apparatus, and at the same time the detector is kept turned off, that is, it is put into a non-counting condition. The detector is maintained in this non-counting condition during the time interval required for the substance which was added to the borehole contents to react with the thermal neutrons. After this interval of time the detector is put into operating or counting condition and the radiation that it detects is principally that which originates in the formations.

In order to explain more adequately this mode of operation of my invention the following considerations are presented. The average time that thermal neutrons diffuse around in a medium before they are captured is called the "lifetime against capture," or simply, "capture time." From the known chemical composition of any medium and the capture cross section for thermal neutrons of the chemical constituents therein, the capture time of the medium can be conveniently calculated by the formula:

$$\frac{1}{T} = Adv\left(\frac{f_1S_1 + f_2S_2 + f_3S_3 + \ldots}{f_1M_1 + f_2M_2 + f_3M_3 + \ldots}\right)$$

where

T is capture time in seconds,
A is Avogadro's number, $6 \times 10^{23}$ atoms/mole,
$d$ is density of medium in gm./cm.$^3$,
$v$ is velocity of thermal neutrons, $2.2 \times 10^5$ cm./sec.,
$f_1$, etc. are atomic percent concentrations of the various elements,
$S_1$, etc. are respective capture cross sections of elements, in cm.$^2$, and
$M_1$, etc. are respective atomic weights of elements, in gm./mole.

Substituting for A, and expressing all cross sections in terms of the "barn" ($10^{-24}$ cm.$^2$) the formula becomes:

$$T = \left(1.3 \times 10^{5d} \frac{f_1S_1 + f_2S_2 + f_3S_3 + \ldots}{f_1M_1 + f_2M_2 + f_3M_3 + \ldots}\right)^{-1}$$

Computation with this formula yields "capture times" for average earth's crust, baryte mud, and water of 200, 230 and 216 microseconds respectively, based on data given in the table:

more and Sands, McGraw-Hill, 1949) which is connected to both the source and the detector. The burst is stopped and the operation of the detector is delayed for a further 65 microseconds by the gating device which then allows the detector to be put into counting condition. Since 65 microseconds is about 3 times as long as the capture time of thermal neutrons in the contents of the borehole, but only about 0.3 times as long as the capture time in the formation, the intensity of the gamma radiation originating in the contents of the borehole has decayed to $e^{-3}$, or about 5%, of its initial intensity, whereas the intensity of the gamma radiation originating in the formations has decayed to $e^{-0.3}$, or about 75%, of its initial intensity. Thus at the end of the 65 microseconds, substantially the only radiation that is detected by the detector is gamma radiation from the formation. Thus the desired discrimination against radiation originating in the contents of the borehole is accomplished.

I have further discovered that when one of the foregoing thermal neutron-capturing substances is placed around the sensitive portion of a radiation detector which is in a borehole containing a hydrogenous fluid, the substance absorbs thermal neutrons substantially as fast as the hydrogen in the fluid produces them from fast neutrons. Thus a portion of the logging tool (for example the outer jacket) may be impregnated with the neutron-capturing substance with the result that the substance acts as a "sink" for thermal neutrons and establishes a zone of low thermal neutron flux around the detector large enough to include substantially the entire annulus of the borehole fluid around the radiation detector. In this manner the hydrogen in the borehole fluid is substantially deprived of any chance of reacting with the thermal neutrons it creates and consequently of its ability to emit gamma radiation by such a reaction. The quantity of neutron-reactive substance used is such that the zone of its effectiveness as a neutron sink does not extend substantially beyond the wall of the borehole.

Because of this sink action, the material need not completely surround the sensitive portion of the detector. For example, the substance may comprise, or be incorporated in, a series of spaced-apart rods which encircle the sensitive portion of the detector. In such an arrangement

*Table of f Values Used in Computation*

| Elements | O | Si | Al | Fe | Ca | Na | K | Mg | Ti | H | Ba | S |
|---|---|---|---|---|---|---|---|---|---|---|---|---|
| Cross Section, barns | .001 | .2 | .22 | 2.5 | .5 | .45 | 2.5 | .3 | 5.0 | 0.32 | 1.3 | 0.4 |
| Avg. Earth $d=2.7$ | 46.7 | 27.7 | 8.1 | 5.0 | 3.6 | 2.8 | 2.6 | 2.1 | 0.6 | 0.1 | | |
| Baryte Mud $d=1.4$ | 36 | | | | | | | | | 61 | 1.3 | 1.3 |
| Water $d=1.0$ | 33 | | | | | | | | | 67 | | |

Now, the thermal neutron cross section of cadmium has the high value of 2500 barns; thus if as little as 0.25 atomic percent of cadmium is added to baryte drilling mud, the above formula shows that the thermal neutron capture time of the mud is reduced to 22 microseconds. As another example, if 9 atomic percent of chlorine is added to baryte drilling mud, the capture time of the mud is reduced to 40 microseconds. The cadmium can be added to the drilling mud as an appropriate compound, for example, cadmium sulfide, and the chlorine can be added, for example, as saturated brine. Assume that a cadmium-containing substance is added to the contents of a borehole and that a neutron-gamma logging tool is passed through the borehole. Then, as one mode of operation contemplated by my invention, the following sequence of events occur: A burst of fast neutrons from the source in the logging tool is sent into the borehole and the surrounding formations for one millisecond. During this time the detector is kept in a non-operating condition by means of a rapid electronic gating device (such as described in Electronics—Experimental Techniques, by Elthe substance will react with the thermal neutrons existing in the environment around the detector as explained above.

In order to clarify the invention and demonstrate its advantages, attention is drawn to the accompanying drawing wherein:

FIGURE 1A depicts a vertical elevation of a further embodiment of the logging instrument shown in FIGURE 1.

Figure 1:
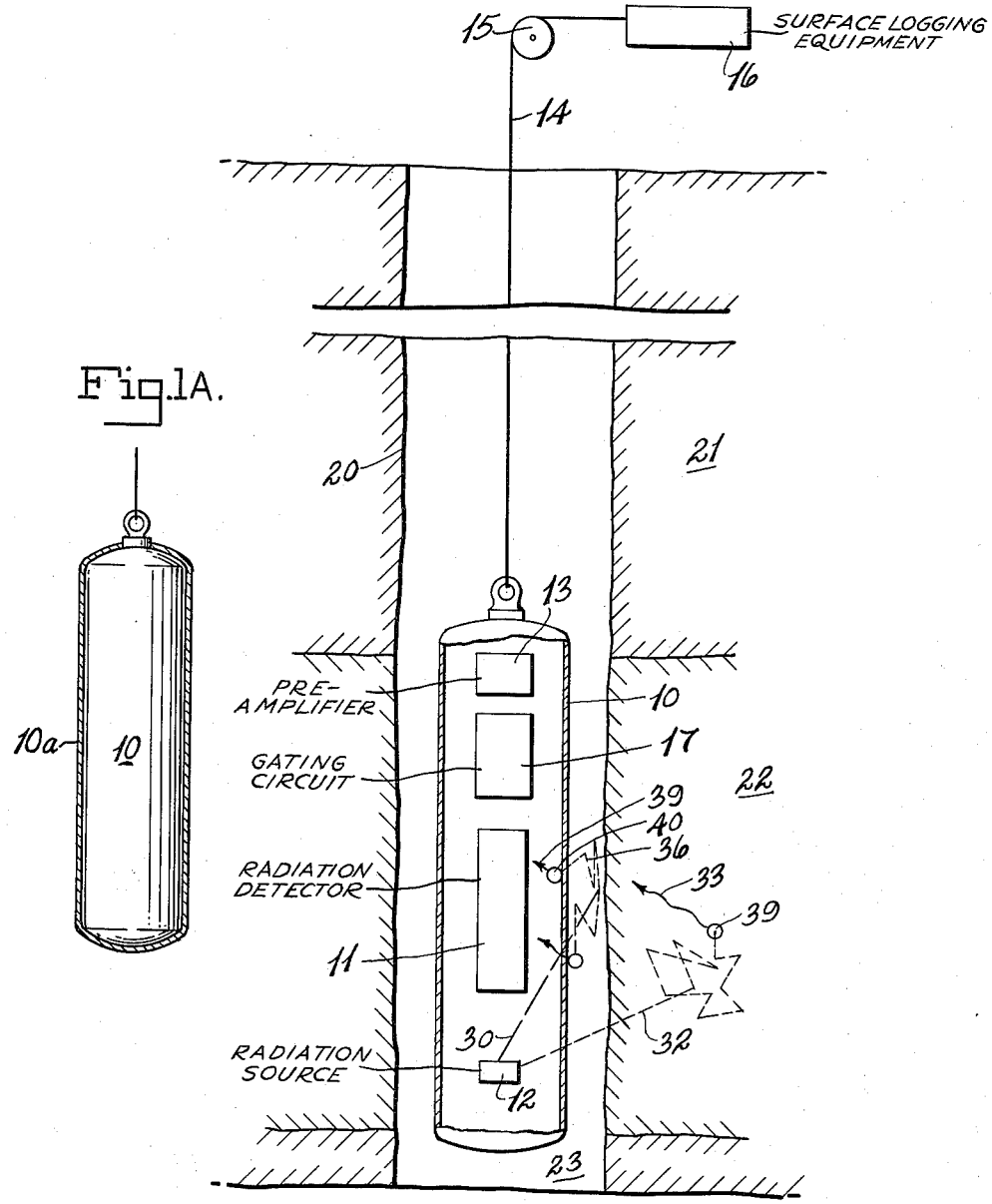
FIGURE 1 depicts a vertical elevation of a portion of the borehole showing a neutron-gamma logging instrument which contains a gating device.

Referring to FIGURE 1, a bore hole 20 is shown as traversing several formations as 21 and 22. Within the borehole 20 is a neutron-gamma logging instrument comprising essentially a housing 10, containing a source of neutrons 12, a gamma radiation detector 11, and a gating circuit 17. The housing 10 can contain a substance which has a high absorption cross section for thermal neutrons.

The housing 10 also encloses a high voltage supply and preamplifier 13 which serves to activate the detector 11 and amplify its output. The logging instrument is suspended by means of the cable 14 which contains conductors for conveying the preamplified output of the detector 11 to the surface. The cable 14 passes over a suitable measuring device 15 by means of which the depth or position of the logging instrument in the borehole can be continuously determined. The preamplified output of the detector 11 passes to an amplifier 16.

A burst of neutrons is sent, for a controlled period of time, outwardly from the source 12. A portion of this burst of neutrons, indicated at 32, penetrates the formation 22 surrounding the borehole and is slowed down by collisions to the thermal energy range. Then, after numerous further collisions with the atoms in the formation, one of these thermal neutrons 32 is captured by an atom 39 of the formation. Each such neutron capture is followed by the emission of one or a small number of gamma photons whose energy is principally in the range of 1 to 10 mev. Some of these gamma photons 33 are directed toward the detector 11, which, with its associated circuits, serves to measure the rate of production of this kind of gamma radiation.

On the other hand, some neutrons 30 from the source 12 are slowed down to the thermal energy range by the atoms of the fluid 23 present in the borehole 20. The neutrons in the thermal energy range are indicated by the numeral 36. Because of the action of the housing 10 as a sink for thermal neutrons, the neutrons 36 instead of reacting with the contents of the borehole 20 move into the housing 10 where they react with the atoms 40 of the thermal-neutron-reactive substance included therein. These reactions result in the emission of radiation 39. The gating circuit 17 controls the timing operations required between the source 12 and the detector 11. A more complete description of the operation of this circuit 17 is given in conjunction with FIGURES 2 and 3. During the time, $t_1$, that the neutron burst 30 is sent from the source 12 the gating circuit 17 is utilized to maintain the detector 11 inoperative, and it is kept inoperative for a period of time, $t_2$, which is selected to be greater than the capture time of neutrons in the borehole and less than the capture time of neutrons in the formation. Since the capture time of the neutrons in the borehole is measurably less than in the formation, and since the off- or inoperative-time of the detector is usually intermediate between these two times, the detector does not detect nor measure the radiation 39 originating from the thermal neutron-reactive substance in the housing 10, but measures almost exclusively the radiation 33 which originates in the formation.

Figure 2:
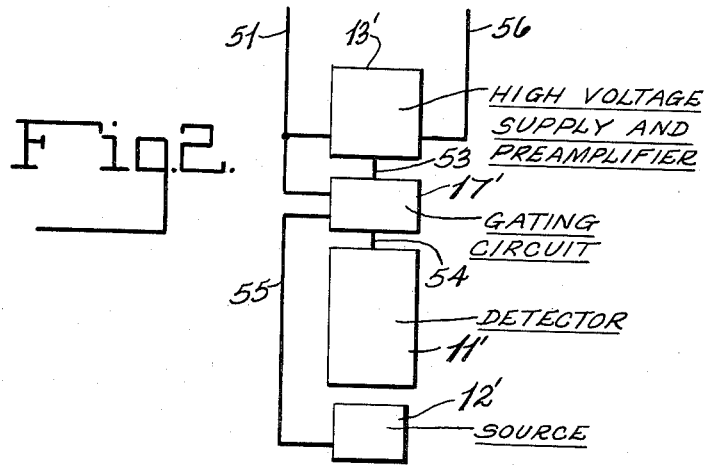
FIGURE 2 is a block diagram of a circuit which supplies the necessary power required to operate the invention as it is practiced in the form shown in FIGURE 1.
Figure 3:
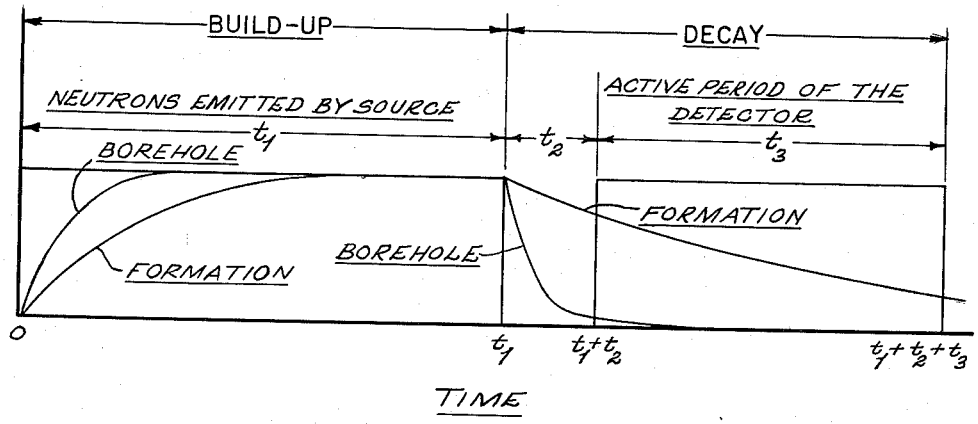
FIGURE 3 is a graph of the sequence of events which occur between the source and detector during a period of logging.

As shown in FIGURE 2, power is supplied to the high voltage supply and preamplifier 13', and also to the gating circuit 17', through line 51. The graph shown in FIGURE 3 is used in conjunction with FIGURE 2 for a further explanation of the sequence of events which occur when the circuit diagrammed in FIGURE 2 is in operation. The steps which are taken during one time cycle of the circuit comprise those of turning on the source 12 by means of the gating circuit 17' through line 55 for a period of time $t_1$, delaying the detector 11' for a period of time $t_2$, and then activating the detector 11' for a period of time $t_3$, by connecting the high voltage supply and preamplifier 13' through lines 53 and 54 to the detector 11'. This final operation both connects the detector 11' to its source of power and the detector output through to its output line 56 which serves to carry the output signal to the surface. At any time after the sum of $t_1$, $t_2$, and $t_3$ the next cycle can start. In the example used above with a cadmium additive in the borehole, $t_1$ is one millisecond (1000 microseconds), $t_2$ is 65 microseconds, and $t_3$ was not specified but could be, say, 500 microseconds.

Also shown in FIGURE 3 are the corresponding decay curves for the gamma radiation activity in the two zones which it is desired to distinguish, namely the formation and the borehole with additive. Under these conditions it can be seen that the gamma ray contribution of the borehole is relatively unimportant by the time that the detector is made active.

Preferably $t_1$ is longer than the longer of the two capture times (that of the formations and that of the borehole). In general, this means that $t_1$ is longer than the capture time in the formation. $t_1$ is preferably longer than both capture times in order to assure bringing the gamma radiation activity in both the formation and the borehole substantially up to maximum intensity. For less irradiation time than that prescribed, the gamma radiation activity would be nearer maximum intensity in the short capture time region than in the long capture time region, and in the case of discriminating formation effects from effects in the borehole with additive, this would mean that the formation effects would be at less than full intensity and the borehole effects at nearly full intensity. The deactive time, $t_2$, on the other hand, is preferably intermediate between the two capture times in order to effect the best discrimination between the formation and borehole effects. The active time, $t_3$, may be of any practical duration, but there is little to be gained by extending it beyond five times the longer capture time, since the gamma radiation activity will have decayed to very low intensity by that time.

If a Geiger-Müller tube is used as the detector, a gating circuit may not be required. Geiger-Müller tubes commonly have dead times of 50 to 200 microseconds and this dead time can be utilized as the period during which the detector does not operate. The proposed method of operation would then include the step wherein the Geiger-Müller tube is caused to go into discharge at the time of the burst of neutrons from the source. Then, at the end of the dead time, the tube automatically becomes sensitive and registers radiation from the formations.

A simple method of using the start of the neutron burst to discharge Geiger-Müller tube and initiate the automatic time lag is to allow the first neutron-induced gamma ray that causes the tube to fire to serve as the gating signal. The duration of the neutron pulse must be chosen so that the net effect is to provide the desired delay after the end of the neutron pulse and before the activation of the detector. Thus, for example, suppose the Geiger-Müller tube dead time is known to be 180 microseconds. If a delay time of 130 microseconds is desired after cessation of neutrons, then the neutron pulse should last only 50 microseconds. Alternatively, the desired delay could be provided by taking a trigger pulse from the end of the neutron burst and allowing it to gate the high voltage onto the previously off tube. Sufficient overshot of this high voltage is easily obtained to cause the tube to discharge, enter its dead time, and then automatically return to duty at the end of the dead time.

The pulsed source 12 may be obtained by using a neutron-emitting instrument capable of pulsed operation such as a linear accelerator when it is used with a suitably chosen neutron-emitting target, for example, such as that described in Nucleonics, vol. 9, pages 51 to 57, October 1951, or a betatron used with a neutron-emitting target. A conventional neutron source, for example, polonium-beryllium or radium-beryllium, can be used when the pulsed effect is obtained by means of electromechanically operated shields or shutters, such as that described in U.S. Patent 2,275,742.

Many modifications of the present invention other than those described hereinabove are contemplated. For example, the logging instrument itself can be completely surrounded by a shell of such neutron capturing material, or by spaced rods or a cage or basket comprised of or containing such a material.

FIGURE 1A illustrates a logging instrument which is essentially identical with that shown in FIGURE 1 including a housing 10, exactly like that of FIGURE 1, and which further includes an outer shell or coating 10a comprising neutron absorbing material as described above.

Furthermore, although in the examples described herein it has been the intention to make the capture time of the borehole less than that of the formation, the invention is not limited to this condition since it is also contemplated that additives can be used to make the capture time of the borehole contents greater than that of the formation.

Obviously many modifications and variations of the invention hereinabove set forth may be made without departing from the spirit and scope thereof and only such limitations should be imposed as are indicated in the appended claims.

I claim:

1. In a method of geophysical prospecting an earth formation traversed by a fluid-containing bore hole, the combination of steps that comprises traversing the bore hole in the vicinity of a formation about which information is desired with an instrument comprising a source of radioactive radiation and a detector of radiation returning from the formation as a result of exposure to said radioactive radiation, subjecting the formation to said radiation for a predetermined time interval, discontinuing irradiation of the formation, maintaining said detector inoperative during said radiation time interval and for a short period thereafter of sufficient duration to permit decay of substantially all interfering radiation emitted from the bore hole contents including said fluid during the lifetime of neutrons from said source in said contents as a result of said irradiation by said source, then activating and maintaining the detector operative during a further period of time during discontinuoance of said radiation, and selectively detecting penetrative radiation emitted from the formation substantially only during the lifetime of neutrons from said source in said formation.

2. In a method of geophysical prospecting an earth formation traversed by a fluid-containing bore hole, the combination of steps that comprises traversing the bore hole in the vicinity of a formation about which information is desired with an instrument comprising a source of radioactive radiation and a detector of radiation returning from the formation as a result of exposure to said radioactive radiation, subjecting the formation to said radiation for a predetermined time interval, discontinuing irradiation of the formation, maintaining said detector inoperative during said radiation time interval and for a short period thereafter during the average lifetime of neutrons from said source in the fluid in the bore hole and of sufficient duration to permit decay of substantially all interfering radiation emitted from the fluid in the bore hole as a result of said irradiation by said source, then activating and maintaining the detector operative during a further period of time during discontinuance of said radiation, selectively detecting penetrative radiation emitted from the formation substantially only during the lifetime of neutrons from said source in said formation and continuously repeating the foregoing sequence of steps during traversal of the formation.

3. A method of geophysical prospecting which comprises traversing a formation about which information is desired with an instrument containing a neutron source and a detector of penetrative radiation which emanates from the formation as a result of neutron bombardment thereof, maintaining between the sensitive volume of the detector and the formation a substance which has a measurably different capturing power for neutrons than that of average earth formations whereby the intensity of the radiation emitted from said substance between the source and the detector as a result of irradiation will be of maximum intensity during a first time interval following irradiation and whereby the radiation emitted from the earth formation as a result of irradiation will be of maximum intensity during a second time interval following irradiation, said second time interval being different than said first time interval due to the different capturing power of said substance than of average earth formations, bombarding the formation with neutrons from the source, and detecting the resultant penetrative radiation substantially only during said second time interval to the substantial exclusion of said first time interval and which occurs substantially only during the lifetime of neutrons from said source in said formation whereby the detected radiation is predominantly due to radiation emanating from the formation exposed to said bombardment while minimizing the detection of radiation resulting from the substance between the detector and the formation.

4. A method of geophysical prospecting which comprises traversing a formation about which information is desired with an instrument containing a neutron source and a detector of penetrative radiation which emanates from the formation as a result of neutron bombardment thereof, maintaining between the sensitive volume of the detector and the formation a substance which has a substantially greater capturing power for neutrons than that of average earth formations whereby the intensity of the radiation emitted from said substance between the source and the detector as a result of irradiation will be of maximum intensity during a first time interval following irradiation and whereby the radiation emitted from the earth formation as a result of irradiation will be of maximum intensity during a second time interval following irradiation, said second time interval being subsequent to said first time interval due to the greater capturing power of said substance than of average earth formations, bombarding the formation with neutrons from the source, and detecting resultant penetrative radiation substantially only during said second time interval to the substantial exclusion of said first time interval and which occurs substantially only during the lifetime of neutrons from said source in said formation whereby the detected radiation is predominantly due to radiation emanating from the formation exposed to said bombardment while minimizing the detection of radiation resulting from the substance between the detector and the formation.

5. In a method of geophysical prospecting the combination of steps that comprises traversing a formation about which information is desired with an instrument comprising a source of neutrons and a detector of penetrative radiation which emanates from the formation as a result of neutron bombardment thereof, maintaining between the sensitive volume of the detector and the formation a substance which has substantially greater capturing power for neutrons than that of average earth formations, deactivating said detector, irradiationg the formation with neutrons from the source for a predetermined time interval, maintaining said detector deactivated during said irradiation and for a period of time after said irradiation at least equal to the lifetime of said neutrons in said substance maintained between said detector and the formation, thereafter activating and maintaining said detector operative during a predetermined period of time, and detecting penetrative radiation emanating from the formation which strikes the sensitive volume of the detector substantially only during the lifetime of neutrons from said source in said formation.

6. The method according to claim 5 in which the substance which is maintained between the sensitive volume of the detector and the formation contains an element selected from the class consisting of cadmium, chlorine, mercury, cobalt, samerium, europium, gadolinium, iridium, lithium and boron.

7. In a method of geophysical prospecting the combination of steps that comprises traversing a formation about which information is desired with an instrument comprising a source of neutrons and a detector of penetrative radiation which emanates from the formation as a result of neutron bombardment thereof, maintaining between the sensitive volume of the detector and the formation a substance which has substantially greater capturing power for neutrons than that of average earth formations, deactivating said detector, irradiating the formation with neutrons from the source for a predetermined time interval, maintaining said detector deactivated after said irradiation for a period of time at least equal to the lifetime of said neutrons in said substance which is maintained between said detector and the formation, thereafter activating said detector, and detecting only that resultant penetrative radiation which arrives at said detector after a delay time greater than the average time of neutron capture in said substance and less than five times the average time for neutron capture in the formation.

8. The method according to claim 7 in which the substance which is maintained between the sensitive volume of the detector and the formation contains an element selected from the class consisting of cadmium, chlorine, mercury, cobalt, samerium, europium, gadolinium, iridium, lithium and boron.

9. In a method of geophysical prospecting the combination of steps that comprises traversing a formation about which information is desired with an instrument comprising a source of neutrons and a Geiger-Müller detector of the penetrative radiation which emanates from the formation as a result of neutron bombardment thereof, maintaining between the sensitive volume of the detector and the formation substance which has substantially greater capturing power for neutrons than that of average earth formations, irradiating the formation with neutrons from the source for a predetermined time interval, substantially at the time of said irradiation causing said detector to discharge whereafter said detector is automatically deactivated for the period of its dead-time, and thereafter detecting only that resultant penetrative radiation which arrives at said detector after a delay time greater than the average time of neutron capture in said substance and less than five times the average time for neutron capture in the formation.

10. In a method of geophysical prospecting the combination of steps that comprises traversing a formation about which information is desired with an instrument comprising a source of radioactive radiation and a detector of radiation returning from the formation as a result of exposure to said radioactive radiation, maintaining between the sensitive volume of the detector and the formation a substance in which the lifetime of a neutron is measurably shorter than its lifetime in the presence of hydrogenous matter, subjecting the formation to said radiation for a predetermined time interval, maintaining said detector deactivated during said radiation time interval and for a predetermined time interval having a duration at least as long as the average lifetime of a neutron in said substance following the termination of said radiation, thereafter activating and maintaining it operative during a predetermined period of time, and detecting penetrative radiation from the formation which strikes the sensitive volume of the detector substantially only during the lifetime of neutrons from said source in said formation.

11. In a method of geophysical prospecting the combination of steps that comprises traversing a formation about which information is desired with an instrument comprising a source of radioactive radiation and a detector of radiation returning from the formation as a result of exposure to said radioactive radiation, maintaining between the sensitive volume of the detector and the formation a substance in which the lifetime of a thermal neutron is shorter than its lifetime in hydrogenous material, subjecting the formation to said radiation for a predetermined time interval, maintaining said detector deactivated during said radiation time interval and for a predetermined time interval following the termination of said radiation and of duration substantially equal to the lifetime of a neutron in said substance, thereafter activating and maintaining it operative during a predetermined period of time, and detecting penetrative radiation from the formation which strikes the sensitive volume of the detector substantially only during the lifetime of neutrons from said source in said formation.

12. In the logging of a fluid-containing bore hole traversing at least one earth formation about which information is desired, the method of logging which comprises introducing into said bore hole a substance in which the average lifetime of a neutron is shorter than its average lifetime in hydrogenous material, passing through said bore hole a source of neutrons and a detector of radiation resulting from irradiation of an earth formation by neutrons from the source, causing said source to emit a burst of neutrons for irradiating an earth formation about which information is desired, subsequent to the termination of said neutron burst and only after a further time interval substantially corresponding to the said average lifetime of a neutron in said substance detecting radiation emitted from the formation as a result of said burst, wherefore said detected radiation is due substantially entirely to the effect of said burst on the material of the formation including its hydrogen content to the substantial exclusion of interfering radiation due to the contents of the bore hole and which might otherwise be detected.

13. The method of claim 12 wherein the detector is primarily sensitive to gamma radiation resulting from irradiation of the formation with neutrons.

14. In the logging of a fluid-containing bore hole traversing at least one earth formation about which information is desired, the method of logging which comprises introducing into said bore hole a substance in which the average lifetime of a neutron is shorter than its average lifetime in average earth formations, passing through said bore hole a source of neutrons and a detector of radiation resulting from irradiation of an earth formation by neutrons from the source, causing said source to emit a burst of neutrons for irridating an earth formation about which information is desired, subsequent to the termination of said neutron burst and only after a further time interval substantially corresponding to the said average lifetime of a neutron in said substance detecting radiation emitted from the formation as a result of said burst, wherefore said detected radiation is due substantially entirely to the effect of said burst on the formation to the substantial exclusion of interfering radiation due to the contents of the bore hole and which might otherwise be detected.

15. In the logging of a fluid-containing bore hole traversing at least one earth formation about which information is desired, the method which comprises passing through said bore hole a source of neutrons and a detector of radiation resulting from irradiation of an earth formation by neutrons from the source, causing said source to emit a burst of neutrons for irradiating an earth formation about which information is desired, subsequent to the termination of said neutron burst and after a further time interval substantially corresponding to the average lifetime of a neutron in said fluid contents of the bore hole detecting radiation emitted from the formation substantially only during the lifetime of neutrons from said source in said formation as a result of said burst to the substantial exclusion of interfering radiation emitted from the fluid contents of the well during said burst and further time interval, wherefore said detected radiation is due substantially entirely to the effect of said burst on the formation.

16. The method of claim 15 which comprises the additional step of altering the characteristic lifetime for neutrons in the fluid of the bore hole by introducing into the bore hole a material having a substantially different neutron lifetime characteristic.

17. The method of claim 16 wherein the said material introduced into the bore hole has a substantially shorter characteristic neutron capturing time than water.

18. The method of claim 12 wherein the detector is primarily sensitive to neutron radiation resulting from irradiation of the formation with neutrons.

19. The method of logging at least one earth formation traversed by a fluid containing bore hole which comprises the preliminary step of introducing into the bore hole as a constituent of the bore hole fluid a substance which has a substantially different time dependent neutron characteristic than said earth formation in order to alter the time dependent neutron characteristic of the bore hole contents whereby the time dependent neutron characteristic of the fluid contents of the bore hole including said substance is substantially different from the time dependent neutron characteristic of said earth formation so that the intensity of certain radiation emitted from said contents as a result of neutron irradiation thereof will be of maximum intensity during a first time interval following irradiation thereof and whereby said radiation emitted from said earth formations as a result neutron irradiation thereof will be of maximum intensity during a second time interval, said first time interval being different from said second time interval, said method further comprising the steps of irradiating the bore hole contents including said substance and the adjacent earth formation with a burst of neutrons and detecting radiation resulting from said burst in the bore hole substantially only during said second time interval to the substantial exclusion of said first time interval, whereby the detection of the radiation resulting from irradiation of the earth formation is emphasized while the detection of the radiation emanating from the bore hole contents is minimized.

20. The method of claim 19 wherein said substance has a substantially shorter characteristic neutron capture time than water.

21. The method of claim 19, wherein the detected radiation comprises gamma rays.

22. Apparatus for conducting a radioactivity well log of an earth formation traversed by a bore hole including a fluid content which comprises a logging instrument adapted to be passed through a bore hole, said instrument including a source of pulsated neutrons for irradiating earth formations along the traverse of a bore hole, a detector of radiations emitted from the earth formations as a result of said irradiation, a quantity of material having a relatively high neutron capture cross-section as compared with that of hydrogen substantially surrounding the logging instrument in the vicinity of said detector, said quantity of material being sufficiently large to shorten materially the average lifetime of neutrons in the vicinity thereof including the well fluid in the bore hole, and means for selectively recording as a function of depth in the bore hole only radiation detected during a selected time interval occurring after substantial decay of the population of source neutrons in the bore hole contents.

23. Apparatus according to claim 22 wherein the detector is a detector of neutron induced gamma rays.

24. Apparatus according to claim 22 wherein the detector is a detector of neutrons.

25. Apparatus according to claim 22 wherein the material in the vicinity of the detector has a neutron capture cross-section substantially in the range including cadmium, chlorine, mercury, cobalt, samarium, europium gadolimium, iridium, boron and lithium.

26. The method of logging at least one earth formation traversed by a fluid containing bore hole which contains as a constituent of the bore hole fluid a substance which has a substantially different time dependent neutron characteristic than said earth formation whereby the time dependent neutron characteristic including the average lifetime of a neutron in the fluid contents of the bore hole including said substance is substantially different from the time dependent neutron characteristic including the average lifetime of a neutron in said earth formation so that the intensity of certain radiation emitted from said contents as a result of neutron irradiation thereof will be of maximum intensity during a first time interval occurring substantially during the average lifetime of a neutron in said contents following irradiation thereof and whereby said radiation emitted from said earth formations as a result of neutron irradiation thereof will be of maximum intensity during a second time interval occurring substantially during the average lifetime of a neutron in said formations, said first time interval being different from said second time interval, said method comprising the steps of irradiating the bore hole contents including said substance and the adjacent earth formation with a burst of neutrons and detecting radiation resulting from said burst in the bore hole substantially only during said second time interval and substantially only during the lifetime of neutrons from said source in said formation to the substantial exclusion of said first time interval, whereby the detection of the radiation resulting from irradiation of the earth formation is emphasized while the detection of the radiation emanating from the bore hole contents is minimized.

References Cited in the file of this patent
UNITED STATES PATENTS

| | | |
|---|---|---|
| 2,335,409 | Hare | Nov. 30, 1943 |
| 2,515,500 | Fearon et al. | July 18, 1950 |
| 2,689,918 | Youmans | Sept. 21, 1954 |
| 2,862,106 | Scherbatskoy | Nov. 25, 1958 |
| 2,867,728 | Pollock | Jan. 6, 1959 |
| 2,991,364 | Goodman | July 4, 1961 |

FOREIGN PATENTS

| | | |
|---|---|---|
| 724,441 | Great Britain | Feb. 23, 1955 |